US010155634B2

(12) United States Patent
Murata

(10) Patent No.: US 10,155,634 B2
(45) Date of Patent: Dec. 18, 2018

(54) SHEET FEEDING APPARATUS, IMAGE READING APPARATUS, AND IMAGE FORMING APPARATUS

(71) Applicant: CANON KABUSHIKI KAISHA, Tokyo (JP)

(72) Inventor: Wataru Murata, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 15/151,708

(22) Filed: May 11, 2016

(65) Prior Publication Data
US 2016/0347560 A1 Dec. 1, 2016

(30) Foreign Application Priority Data

May 29, 2015 (JP) ................................ 2015-109279
Jul. 6, 2015 (JP) ................................ 2015-135128

(51) Int. Cl.
B65H 3/06 (2006.01)
H04N 1/00 (2006.01)
(Continued)

(52) U.S. Cl.
CPC ............. *B65H 3/0669* (2013.01); *B65H 1/04* (2013.01); *B65H 3/0684* (2013.01);
(Continued)

(58) Field of Classification Search
CPC B65H 3/0669; B65H 3/0684; B65H 2402/31; B65H 2402/341; B65H 2403/51;
(Continued)

(56) References Cited

U.S. PATENT DOCUMENTS 3,815,900 A * 6/1974 Schulze ............... B65H 3/0669
271/118
4,025,178 A * 5/1977 Yokozawa ........... B65H 3/0669
271/10.11
(Continued)

FOREIGN PATENT DOCUMENTS

CN 1110244 A 10/1995
CN 1179386 A 4/1998
(Continued)

OTHER PUBLICATIONS

Chinese Office Action issued in corresponding Chinese Application No. 201610365172.8 dated Sep. 27, 2017.

*Primary Examiner* — Prasad V Gokhale
(74) *Attorney, Agent, or Firm* — Venable LLP

(57) ABSTRACT

A sheet feeding apparatus, comprising:
a feeding rotating member;
a cam member;
a driving force transfer portion configured to transfer a driving force from a drive source to the cam member and include a one-way clutch the one-way clutch transferring a driving force causing the cam member to rotate in a first direction;
a link member configured to press the support member to rotate based on the rotation of the cam member; and
a brake unit configured to reduce a rotational torque which is generated by the cam member pressing the link member to cause the cam member to rotate in a first direction in a case where the cam member rotates in the first direction by a driving force transferred from the drive source through the driving force transfer portion to make the feeding rotating member move from the separation position to the feed position.

20 Claims, 16 Drawing Sheets

(51) Int. Cl.
  *G03G 15/00*  (2006.01)
  *B65H 1/04*  (2006.01)
  *G03G 21/16*  (2006.01)
(52) U.S. Cl.
  CPC ....... *B65H 3/0692* (2013.01); *G03G 15/6511* (2013.01); *G03G 15/6529* (2013.01); *H04N 1/00588* (2013.01); *H04N 1/00602* (2013.01); *B65H 2403/512* (2013.01); *B65H 2403/514* (2013.01); *B65H 2403/53* (2013.01); *B65H 2403/72* (2013.01); *B65H 2403/725* (2013.01); *B65H 2405/324* (2013.01); *B65H 2407/21* (2013.01); *B65H 2515/322* (2013.01); *G03G 21/1647* (2013.01); *G03G 2215/00679* (2013.01); *G03G 2221/1657* (2013.01); *H04N 2201/0081* (2013.01); *H04N 2201/0082* (2013.01)

(58) Field of Classification Search
  CPC ........ B65H 2403/512; B65H 2403/514; B65H 2403/72; B65H 2403/725; B65H 2404/1521; B65H 2513/22; B65H 2513/222; B65H 2515/32; B65H 2515/322
  See application file for complete search history.

(56) References Cited

U.S. PATENT DOCUMENTS

| | | | |
|---|---|---|---|
| 6,056,284 A | * | 5/2000 | Shin .......................... B65H 1/08 271/114 |
| 2008/0265489 A1 | * | 10/2008 | Ng ....................... B65H 3/0684 271/114 |
| 2015/0084263 A1 | * | 3/2015 | Kanzawa ................. B65H 1/14 271/3.2 |
| 2015/0251863 A1 | * | 9/2015 | Tateishi ............... B65H 3/0684 271/117 |

FOREIGN PATENT DOCUMENTS

| | | |
|---|---|---|
| JP | 2011-131949 A | 7/2011 |
| JP | 5523084 B2 | 6/2014 |
| KR | 20000026511 A | 5/2000 |

* cited by examiner

SHEET FEEDING APPARATUS, IMAGE READING APPARATUS, AND IMAGE FORMING APPARATUS

BACKGROUND OF THE INVENTION

Field of the Invention

The present invention relates to a sheet feeding apparatus which feeds a sheet in an image forming apparatus to a sheet conveying path when an image is formed, and an image reading apparatus equipped with the sheet feeding apparatus, and the image forming apparatus.

Herein, examples of the image forming apparatus include an electrophotographic copying machine which forms an image in a recording medium using an electrophotographic image forming system, an electrophotographic printer (for example, a laser beam printer, and an LED printer), and a facsimile apparatus.

Description of the Related Art

As a sheet feeding apparatus equipped in an image forming apparatus, there is a configuration of a so-called manual tray system in which a tray is provided in a side surface of the apparatus and the sheet on the tray is fed besides a configuration of feeding a sheet from a sheet storage portion provided in the apparatus.

The sheet feeding apparatus of the manual tray system is configured such that a pickup roller abuts on the sheet on the tray and the sheet is fed to a sheet conveying path while the pickup roller rotates at the time of feeding the sheet. There are various methods of making the pickup roller abut on the sheet according to applications and specifications. For example, there is a method of making the sheet-stacked tray move toward the pickup roller so as to abut on each other, or a method of making the pickup roller supported to a lifting and lowering plate move toward the sheet according to the movement of the lifting and lowering plate so as to abut on each other.

Herein, when the sheet feeding apparatus performs a feeding operation, a collision noise is generated when the pickup roller abuts on the sheet. On the other hand, in recent years, there is a request for damping the noise when the image forming apparatus is operated. Therefore, a countermeasure for the suppression of the collision noise generated when the pickup roller comes in conflict with the sheet is essential particularly for the sheet feeding apparatus of the manual tray system which is generally provided in a side surface of the apparatus.

Therefore, there is proposed a method of suppressing such a collision noise in the related art. For example, Japanese Patent Laid-Open No. 2011-131949 discloses a sheet feeding apparatus in which the sheet-stacked tray goes up by rotation control of a cam and a biasing force of a spring so as to make the sheet on the tray abut on the pickup roller, and a convex portion which comes in contact with the cam when the tray goes up is provided in the tray. Then, a going-up speed when the tray goes up is restricted by a friction force generated when the cam and the convex portion of the tray come in contact with each other, so that the collision noise between the pickup roller and the sheet is attenuated.

In recent years, from the viewpoint of space saving and cost reduction, a one-way clutch which allows only one-directional rotation is frequently used as a drive configuration of the sheet feeding apparatus. Herein, in a case where the one-way clutch is provided in a driving force transfer portion which transfers a driving force of a drive source such as a motor to the cam of the configuration disclosed in Japanese Patent Laid-Open No. 2011-131949, a load in the one-directional rotation is lightened by the characteristics of the one-way clutch. Therefore, when the biasing force of the spring is large, the cam and a rotation shaft supporting the cam rotate in the light load direction by the biasing force of the spring. For this reason, the cam receives both rotation driving forces, that is, a driving force transferred from the drive source and a driving force based on the biasing force of the spring. Therefore, the driving force causing the cam to rotate becomes large, and the pickup roller comes into strong conflict with the sheet, thereby generating a loud collision noise.

SUMMARY OF THE INVENTION

A typical configuration of the present invention is a sheet feeding apparatus configured to feed a sheet, including: a feeding rotating member configured to abut on a stacked sheet and feed the sheet; a first cam member configured to cause a support member supporting the feeding rotating member to rotate when the first cam member rotates, and cause the feeding rotating member to move to a feed position where abutting on the stacked sheet to feed the sheet and to a separation position where being separated from the sheet; a driving force transfer portion configured to transfer a driving force from a drive source to the first cam member and include a one-way clutch, the one-way clutch transferring a driving force causing the first cam member to rotate in a first direction and not transferring a driving force causing the first cam member to rotate in a second direction opposed to the first direction; a link member configured to press the support member to rotate based on the rotation of the first cam member; and a brake unit configured to reduce a rotational torque which is generated by the first cam member pressing the link member to cause the first cam member to rotate in a first direction in a case where the first cam member rotates in the first direction by a driving force transferred from the drive source through the driving force transfer portion to make the feeding rotating member move from the separation position to the feed position.

Further features of the present invention will become apparent from the following description of exemplary embodiments with reference to the attached drawings.

DESCRIPTION OF THE EMBODIMENTS

Hereinafter, the description will be made about a configuration and an image forming operation of an image forming apparatus A equipped with a sheet feeding apparatus according to a first embodiment of the invention with reference to the drawings, and then the sheet feeding apparatus will be described.

(First Embodiment)

<Image Forming Apparatus>

Figure 1:
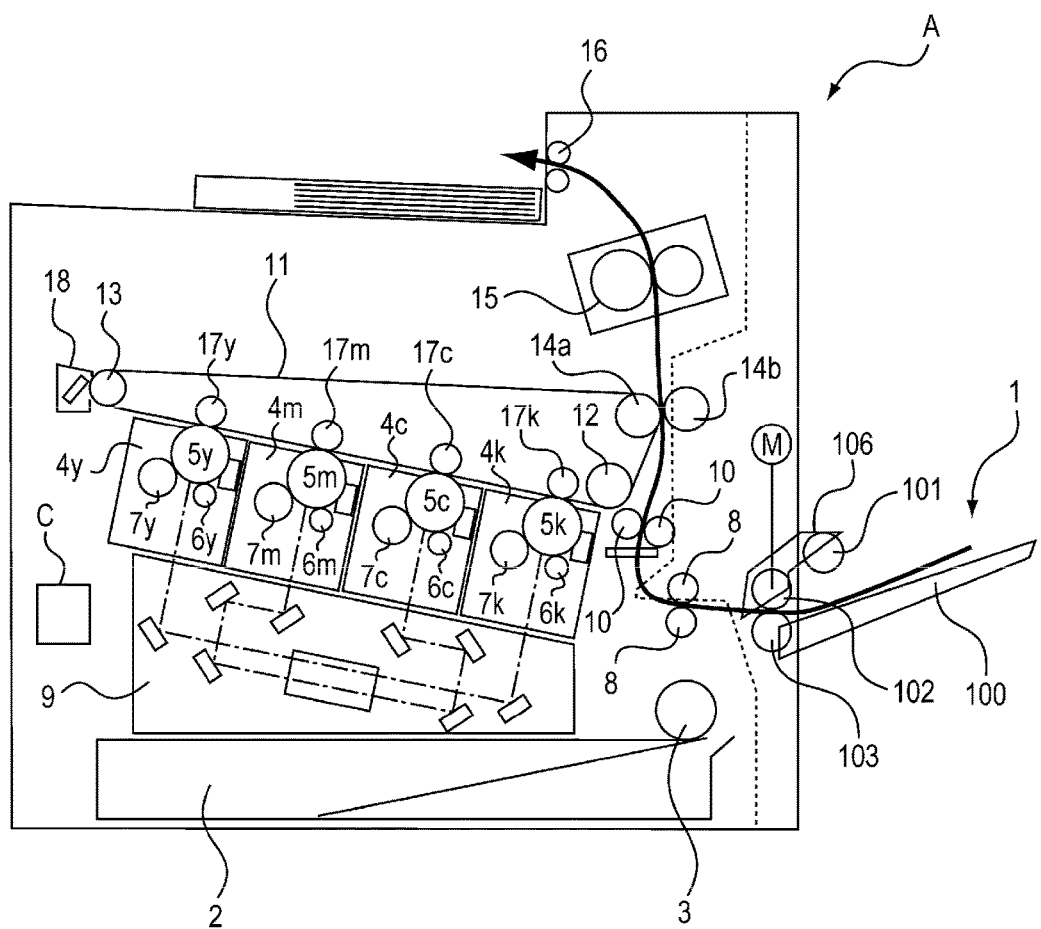
FIG. 1 is a cross-sectional view schematically illustrating an image forming apparatus according to a first embodiment.

As illustrated in FIG. 1, the image forming apparatus A includes a sheet stacking portion on which a sheet S as a recording medium is stacked, an image forming portion which transfers a toner image onto the sheet S, a sheet feeding portion which supplies the sheet S to the image forming portion, and a fixing portion which fixes the toner image to the sheet S.

The sheet stacking portion includes a sheet storage portion 2 which stores the sheet S in the image forming apparatus A. In addition, there is provided a tray feeding portion 1 (a manual tray) serving as the sheet feeding apparatus which is provided outside the apparatus, and on which a user stacks the sheet S on a tray 100 at the time of forming an image so as to feed the sheet S.

The image forming portion includes a process cartridge 4 which is detachably attachable with respect to the image forming apparatus A, an intermediate transfer unit, and a laser scanner unit 9. The process cartridge 4 includes process cartridges 4y, 4m, 4c, and 4k which correspond to colors (yellow, magenta, cyan, and black) and are arranged in parallel to each other in a line. In addition, each process cartridge 4 includes a photosensitive drum 5 (5y, 5m, 5c, and 5k) as an image bearing member, a charging roller 6 (6y, 6m, 6c, and 6k), and a developing roller 7 (7y, 7m, 7c, and 7k).

The intermediate transfer unit includes a primary transfer roller 17 (17y, 17m, 17c, and 17k), an intermediate transfer belt 11, a driving roller 12, a tension roller 13, a secondary transfer counter roller 14a, and a cleaning device 18. The intermediate transfer belt 11 is configured as an endless cylindrical belt, and suspended on the driving roller 12, the tension roller 13, and the secondary transfer counter roller 14a.

When a controller C issues a print signal at the time of forming an image, the sheet S stored and stacked in the sheet stacking portion is fed out to a sheet conveying path by a feeding roller 3 or a pickup roller 101. Thereafter, the sheet S is fed to a registration roller 10 through a conveying roller 8. Herein, when the sheet S comes into contact to a nip portion formed by a pair of registration rollers 10, the registration roller 10 is stopped. Then, the conveying roller 8 presses the sheet S in the nip portion, so that the sheet S is bent between the conveying roller 8 and the registration roller 10 and at the same time the leading end of the sheet S is corrected to be regularly arranged. Then, after the leading end of the sheet S is regularly arranged, the registration roller 10 rotates to feed out the sheet S to the image forming portion.

On the other hand, first the surface of the photosensitive drum 5 is charged by the charging roller 6 in the image forming portion. Then, the laser scanner unit 9 emits a laser light beam from an internally-provided light source (not illustrated), and irradiates the photosensitive drum 5 with the laser light beam. Therefore, an electrostatic latent image is formed on the surface of the photosensitive drum 5. The toner image is formed on the photosensitive drum 5 by developing the electrostatic latent image using the developing roller 7. The toner image formed on the photosensitive drum 5 is primarily transferred onto the intermediate transfer belt 11 by applying a transfer bias to the primary transfer roller 17. The intermediate transfer belt 11 rotates when the driving roller 12 receives a driving force from a drive source such as a motor (not illustrated). The primarily transferred toner image reaches a secondary transfer portion formed by the secondary transfer counter roller 14a and a secondary transfer roller 14b which are formed on the downstream side in the rotation direction of the intermediate transfer belt 11, and the toner image is transferred onto the sheet S.

The sheet S transferred with the toner image is sent to a fixing device 15 to be heated and pressed. Then, the toner image is fixed onto the sheet S, and then conveyed by a discharge roller 16 to be discharged to a discharge portion.

<Sheet Feeding Apparatus>

Next, the entire configuration and the operations of the tray feeding portion 1 as the sheet feeding apparatus will be described.

Figure 2:
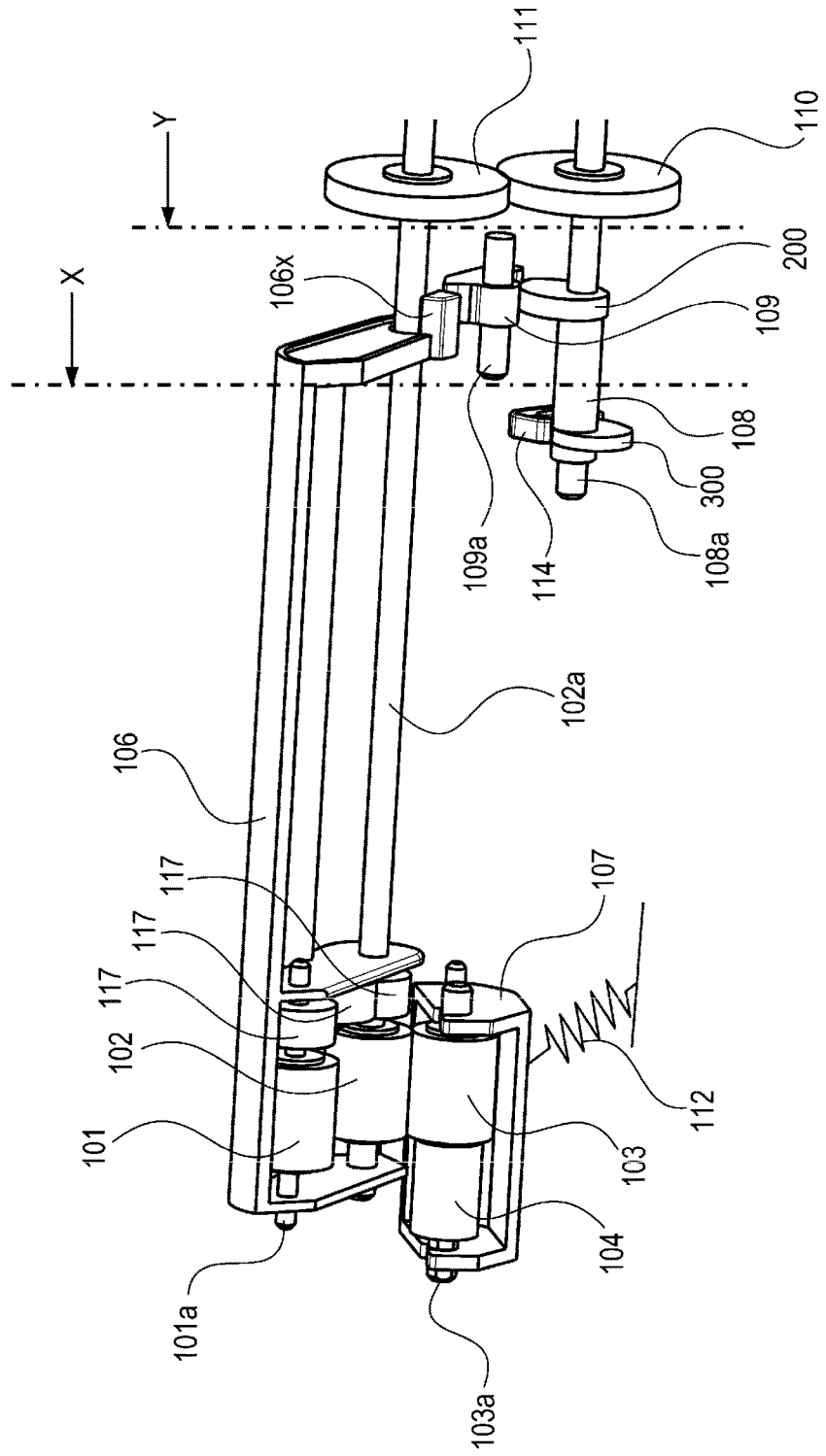
FIG. 2 is a diagram schematically illustrating a tray feeding portion according to the first embodiment.

As illustrated in FIG. 2, the tray feeding portion 1 includes the pickup roller 101 (a feeding rotating member) which picks up the sheet S stored in the tray 100. In addition, there is provided a feeding roller 102 which feeds the sheet S picked up by the pickup roller 101 to the sheet conveying path. In addition, there is provided a separation roller 103 which is provided in order to avoid the sheets S from being duplicated and rotates in a reverse direction to a sheet conveying direction so as to separate the duplicated sheets S.

The feeding roller 102 is rotatably provided in the feeding roller shaft 102a supported by a multiframe (not illustrated). In addition, a lifting and lowering plate 106 as a support member to support the pickup roller 101 is also rotatably provided in the feeding roller shaft 102a. Therefore, the pickup roller 101 moves to a feed position where abutting on the sheet S, and moves to a separation position where being separated from the feed position according to the rotation of the lifting and lowering plate 106. Further, the pickup roller 101 is rotatably provided in the pickup roller shaft 101a supported by the lifting and lowering plate 106.

In addition, the lifting and lowering plate 106 is controlled in its rotation by a first cam 200 of a multicam 108 through a release link 109 (a link member). The multicam 108 is rotatably provided in a multicam shaft 108a, and configured to be integrally formed with the first cam 200 (a first cam member) and a second cam 300 (a second cam member). Therefore, the first cam 200 and the second cam 300 rotate in conjunction. Further, the first cam 200 and the second cam 300 may be integrally formed from a viewpoint of cost reduction, but may be separately formed as long as these components rotate in conjunction.

Further, the rotations of the feeding roller shaft 102a and the feeding roller 102 are synchronized by a coupling member (not illustrated). In addition, the pickup roller shaft 101a and the pickup roller 101 are also synchronized in their rotations. In addition, the multicam 108 and the multicam shaft 108a are also synchronized in their rotations.

In addition, the separation roller 103 is rotatably provided in the separation roller shaft 103a supported to the separation roller holder 107. The separation roller holder 107 is rotatably provided in the multiframe (not illustrated), and pressed by a pressuring spring 112 provided between the multiframe and the separation roller holder 107. Further, the separation roller shaft 103a is regulated in its rotation by stopping the rotation of the separation roller holder 107. In addition, a torque limiter 104 synchronized in rotation by the coupling member is provided on the separation roller shaft 103a.

<Drive Portion>

Next, a configuration of a drive portion of the tray feeding portion 1 will be described. The drive portion of the tray feeding portion 1 includes a feed gear 111, a cam gear 110, and a motor (not illustrated) as illustrated in FIG. 2.

The feed gear 111 (a first gear) is provided on a side near the end portion of the feeding roller shaft 102a (a first shaft), and transfers a driving force of a motor M (see FIG. 1) as the drive source. When the driving force of the motor is transferred to the feeding roller shaft 102a through the feed gear 111, the driving force is also transferred to the pickup roller shaft 101a through a drive train 117. Therefore, the pickup roller 101 can rotate in synchronization with the rotation of the feeding roller 102.

In addition, the multicam shaft 108a (a second shaft) serving as a rotation shaft of the multicam 108 is disposed below the feeding roller shaft 102a, and the cam gear 110 (a second gear) is provided to be engaged with the feed gear 111 on a side near the end portion of the multicam shaft 108a. Therefore, the feed gear 111 receives a driving force from the motor and rotates, so that the driving force is also transferred to the cam gear 110.

Figure 3:
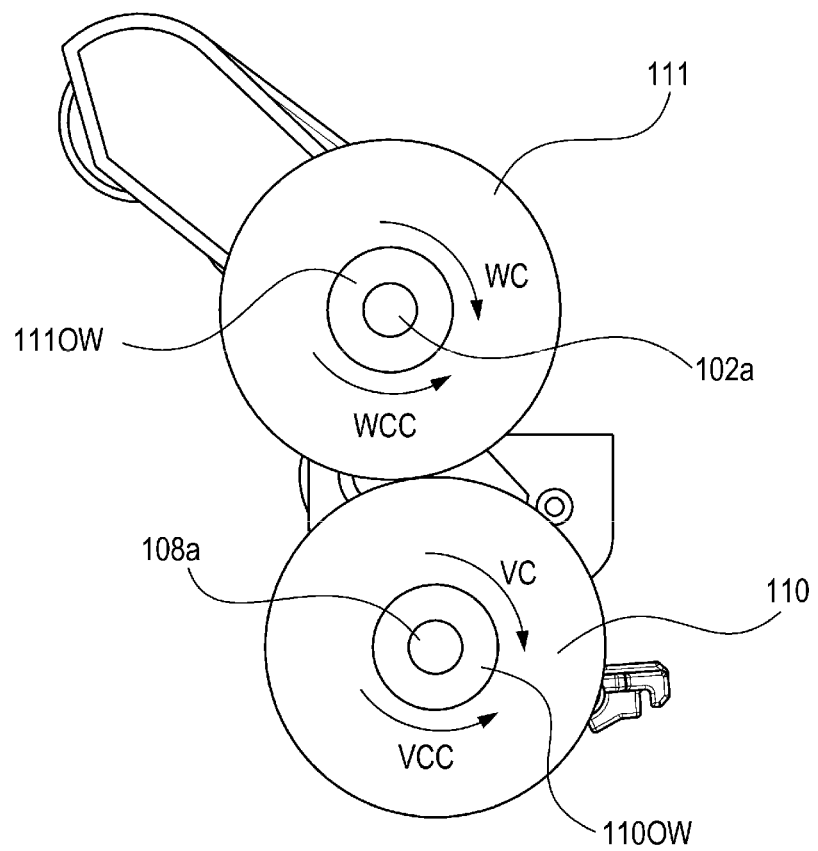
FIG. 3 is a diagram for describing a configuration of a gear which transfers a driving force to the tray feeding portion according to the first embodiment.

In addition, as illustrated in FIG. 3, a one-way clutch 111OW is pressed fit into the center of the feed gear 111 to be synchronized with the rotation of the feed gear 111. In addition, a one-way clutch 110OW is pressed fit into the center of the cam gear 110 engaged with the feed gear 111 to be synchronized with the cam gear 110.

As shown in the following Table 1, the one-way clutch 111OW and the one-way clutch 110OW transfers a rotation driving force to the feeding roller shaft 102a when the feed gear 111 rotates in a WCC direction (a first direction) illustrated in FIG. 3. On the other hand, when rotating in a WC direction (a second direction), the feed gear 111 does not transfer the rotation driving force but runs idle. Similarly, when rotating in a VCC direction (the first direction), the cam gear 110 transfers the rotation driving force to the multicam shaft 108a. When rotating in a VC direction (the second direction), the cam gear 110 does not transfer the rotation driving force but runs idle.

TABLE 1

| Rotation Direction of Feed Gear 111 | Feeding Roller Shaft 102a | Rotation Direction of Cam Gear 110 | Multicam Shaft 108a |
|---|---|---|---|
| WC | Idle Running | VCC | Rotation (VCC Direction) |
| WCC | Rotation (WCC Direction) | VC | Idle Running |

Further, with characteristics of the one-way clutch, the feeding roller shaft 102a can rotate in the WCC direction faster than the rotation of the feed gear 111. Similarly, the multicam shaft 108a can rotate in the VCC direction faster than the rotation of the cam gear 110.

<Separation Position>

Next, the description will be made about a configuration in a state where a feed job is not input yet and the tray feeding portion 1 does not perform a sheet feeding operation, and a relation between forces operated on the members. At this time, the pickup roller 101 is at the separation position separated from the sheet S. In addition, since the motor is not driven and a moment causing the rotation of the multicam 108 as described below is not generated, the multicam 108 does not rotate.

Figure 4:
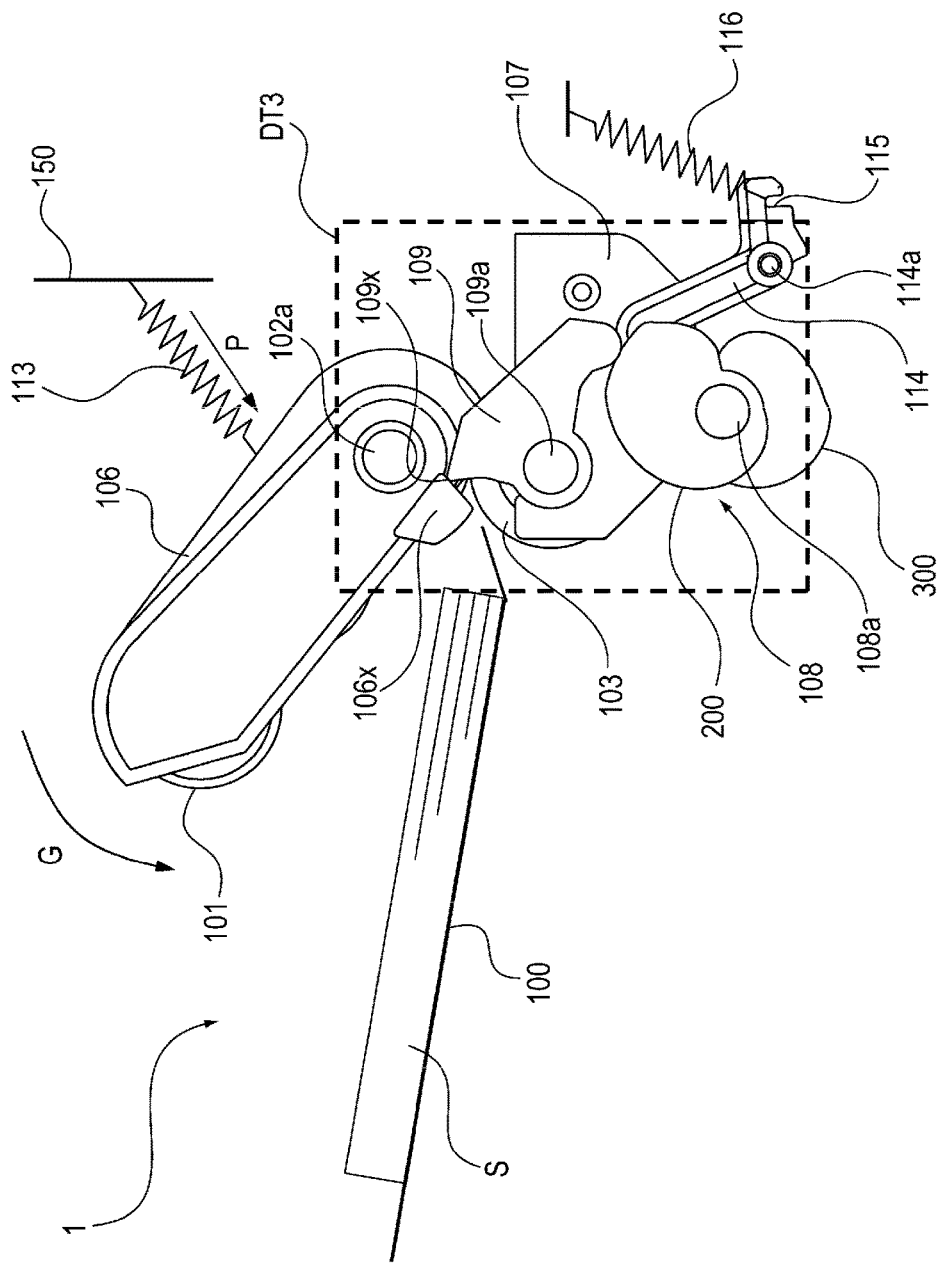
FIG. 4 is a diagram for describing an operation of the tray feeding portion according to the first embodiment.

First, the description will be made about the first cam 200 and the release link 109 which control the rotation of the lifting and lowering plate 106. FIG. 4 is a cross-sectional view taken along a line Y illustrated in FIG. 2. As illustrated in FIG. 4, a roller pressuring spring 113 is attached between a wall surface 150 fixed to the multiframe (not illustrated) and the lifting and lowering plate 106, and the roller pressuring spring 113 applies a force to the lifting and lowering plate 106 in a direction P of arrow. Therefore, a moment MG causing the lifting and lowering plate 106 to rotate about the feeding roller shaft 102a in a direction G of arrow is generated.

Figure 5:
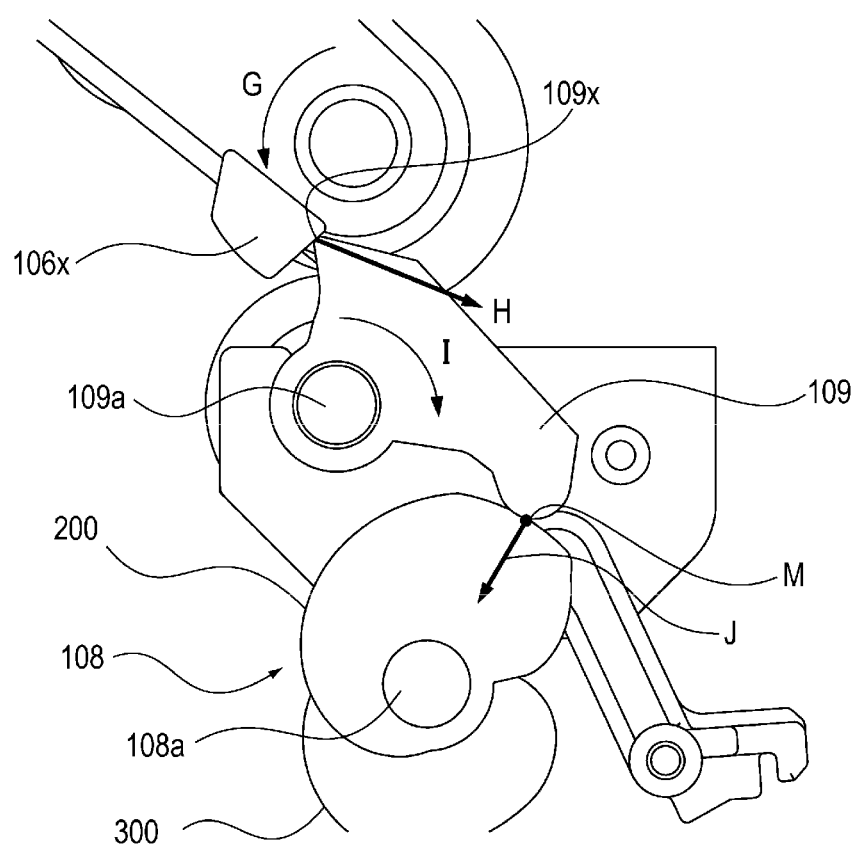
FIG. 5 is a diagram for describing an operation of a first cam of the tray feeding portion according to the first embodiment.

FIG. 5 is an enlarged view illustrating a region DT3 of FIG. 4. As illustrated in FIG. 5, when the moment MG in the direction G of arrow is generated, a force FH in a direction H of arrow causing a convex portion 106x provided in the lifting and lowering plate 106 to move toward a plate abutting portion 109x provided in the release link 109 is generated due to the operation of the moment MG. Then, when the convex portion 106x presses the plate abutting portion 109x due to the operation of the force FH, a moment MI in a direction I of arrow is generated about the release link shaft 109a as a shaft of the release link 109. Then, a pressing force FJ of the release link 109 pressing the first cam 200 in a direction J of arrow is generated at Point M as a forcing point due to the operation of the moment MI.

Herein, when the pickup roller 101 is at the separation position, the pressing force FJ faces an axial direction of the multicam shaft 108a. Therefore, the moment causing the rotation of the first cam 200 is not generated, and the first cam 200 is in a stop state.

Figure 6:
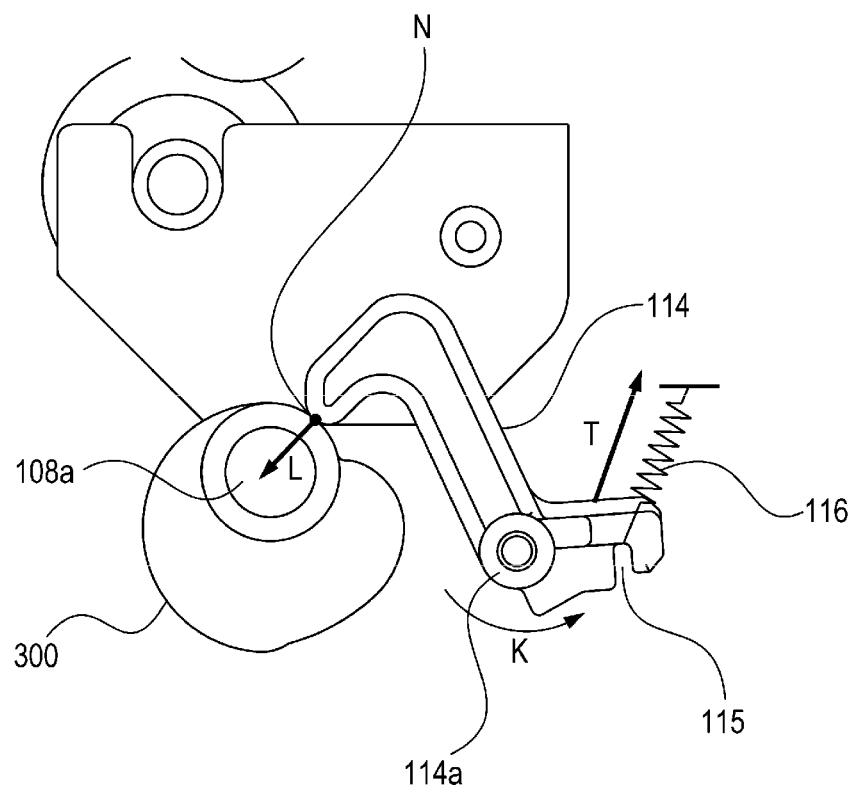
FIG. 6 is a diagram for describing an operation of a second cam of the tray feeding portion according to the first embodiment.

Next, a relation between a brake lever 114 and the second cam 300 will be described. FIG. 6 is a cross-sectional view taken along line X of FIG. 2. As illustrated in FIG. 6, a tension spring 116 attached to the multiframe (not illustrated) is attached to a concave portion 115 of the brake lever 114. Then, a moment MK causing the rotation in a direction K of arrow about the brake lever shaft 114a is generated in the brake lever 114 by a tension force FT of the tension spring 116 in a direction T of arrow. Then, a pressing force FL of the brake lever 114 pressing the second cam 300 in a direction L of arrow is generated at Point N as a forcing point due to the operation of the moment MK.

Herein, when the pickup roller 101 is at the separation position, the pressing force FL faces the axial direction of the multicam shaft 108*a*. Therefore, a moment causing the rotation of the second cam 300 is not generated, and the second cam 300 is in the stop state.

Hitherto, the configuration and the relation between the forces operated on the members when the pickup roller 101 is at the separation position have been described. In other words, the pressing force FJ of the release link 109 pressing the first cam 200 and the pressing force FL of the brake lever 114 pressing the second cam 300 both face the axial direction. In addition, the motor is not driven, and the respective gears do not rotate. Therefore, the first cam 200 and the second cam 300 are in the stop state.

<Moving from Separation Position to Feed Position>

Next, the description will be made about an operation when the feed job is input and the pickup roller 101 moves from the separation position to the feed position. Herein, the feed position is a position when the pickup roller 101 abuts on the sheet S and performs a feeding operation. Further, the tray feeding portion 1 is set such that the pickup roller 101 moves from the separation position to the feed position when it is confirmed that the sheet S is on the tray 100 by a sheet sensor (not illustrated) and a command of the feed job is received.

First, when the command of the feed job is input, a driving force is transferred from the motor M to the feed gear 111, and the feed gear 111 rotates in the WC direction of arrow illustrated in FIG. 3. Herein, as described above, since the driving force is not transferred to the feeding roller shaft 102*a* when the feed gear 111 rotates in the WC direction of arrow, the feeding roller shaft 102*a* does not rotate.

On the other hand, the cam gear 110 engaged with the feed gear 111 rotates in the VCC direction of arrow by the rotation of the feed gear 111 in the WC direction of arrow. Then, as described above, since the driving force is not transferred to the multicam shaft 108*a* when the cam gear 110 rotates in the VCC direction of arrow, the multicam shaft 108*a* also rotates in the VCC direction of arrow. Then, the multicam 108 rotates according to the rotation of the multicam shaft 108*a*, and accordingly the first cam 200 and the second cam 300 also rotate in the VCC direction of arrow.

Figure 7:
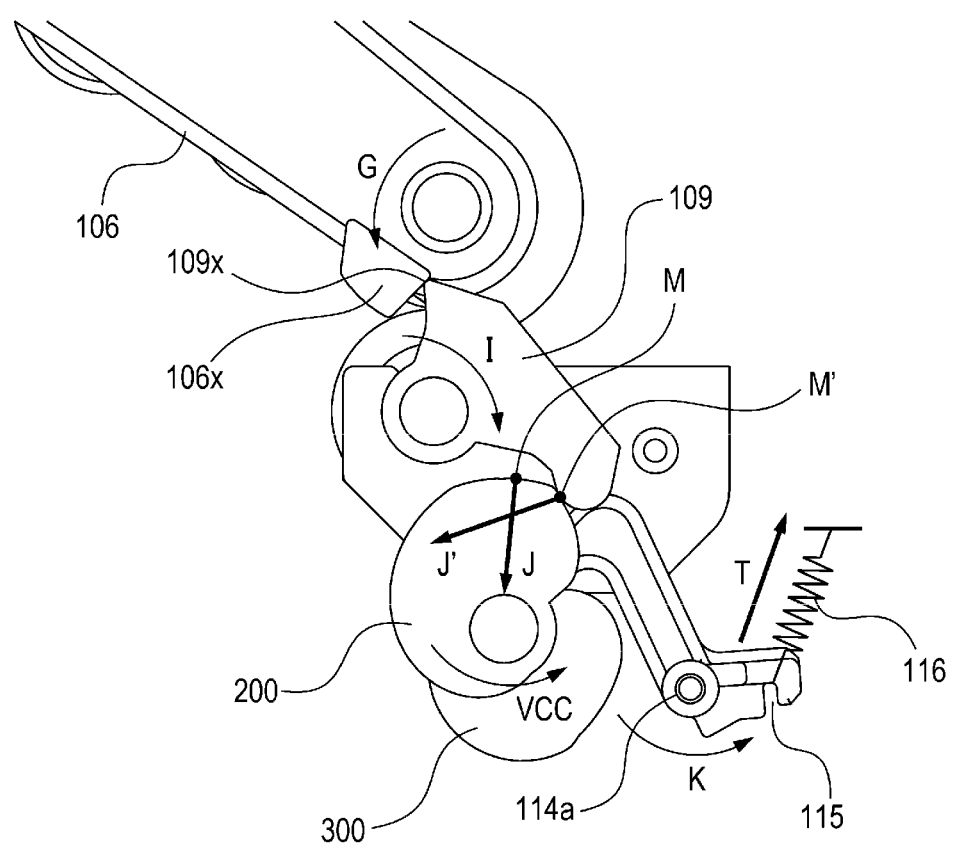
FIG. 7 is a diagram for describing an operation of the first cam of the tray feeding portion according to the first embodiment.

Then, as illustrated in FIG. 7, when the first cam 200 rotates in the VCC direction of arrow, the release link 109 rotates in the direction I of arrow due to having the cam shape. Then, according to the rotation of the release link 109, the plate abutting portion 109*x* moves in a direction separated from the convex portion 106*x*. When the plate abutting portion 109*x* moves in the direction separated from the convex portion 106*x*, the convex portion 106*x* follows the movement of the plate abutting portion 109*x* due to the operation of the moment MG. Therefore, the lifting and lowering plate 106 moves in the direction G of arrow about the feeding roller shaft 102*a*, and the pickup roller 101 goes down in a direction toward the tray 100.

Herein, when the first cam 200 rotates in the VCC direction of arrow, an abutting point between the plate abutting portion 109*x* and the convex portion 106*x* gradually moves from the position of an abutting point M to the position of an abutting point M'. Accordingly, the direction of the release link 109 pressing the first cam 200 is changed from the direction J of arrow (the axial direction of the first cam 200) to a direction J' of arrow.

In this way, when the release link 109 presses the first cam 200 in the direction J' of arrow, there is generated a rotational torque TVCC causing the first cam to rotate in the VCC direction (the first direction). Therefore, in addition to the driving force transferred from the motor M through the feed gear 111 and the cam gear 110 as a driving force transfer portion, the rotational torque TVCC generated in the VCC direction by the release link 109 pressing the first cam 200 is operated on the first cam 200.

In this way, when the rotational torque TVCC is operated on the first cam 200 besides the driving force transferred from the motor M, with the characteristics of the above-described one-way clutch, the first cam 200 rotates in the VCC direction faster than the rotation speed of the motor M which rotates based on the driving force. Therefore, the lifting and lowering plate 106 goes down at a high speed, and the pickup roller 101 comes into conflict with the sheet S, thereby causing a loud collision noise.

For this reason, there is a need to prevent that the lifting and lowering plate 106 goes down at a high speed by the rotational torque TVCC. Therefore, the tray feeding portion 1 according to this embodiment includes the brake lever 114 (a pressing portion) and the second cam 300 as a brake unit. When the brake lever 114 presses the second cam 300 with the rotational torque in the VC direction (the second direction), the rotational torque TVCC is attenuated, so that the rotation speed of the first cam 200 is decelerated. Hereinafter, such a configuration will be described.

Figure 8:
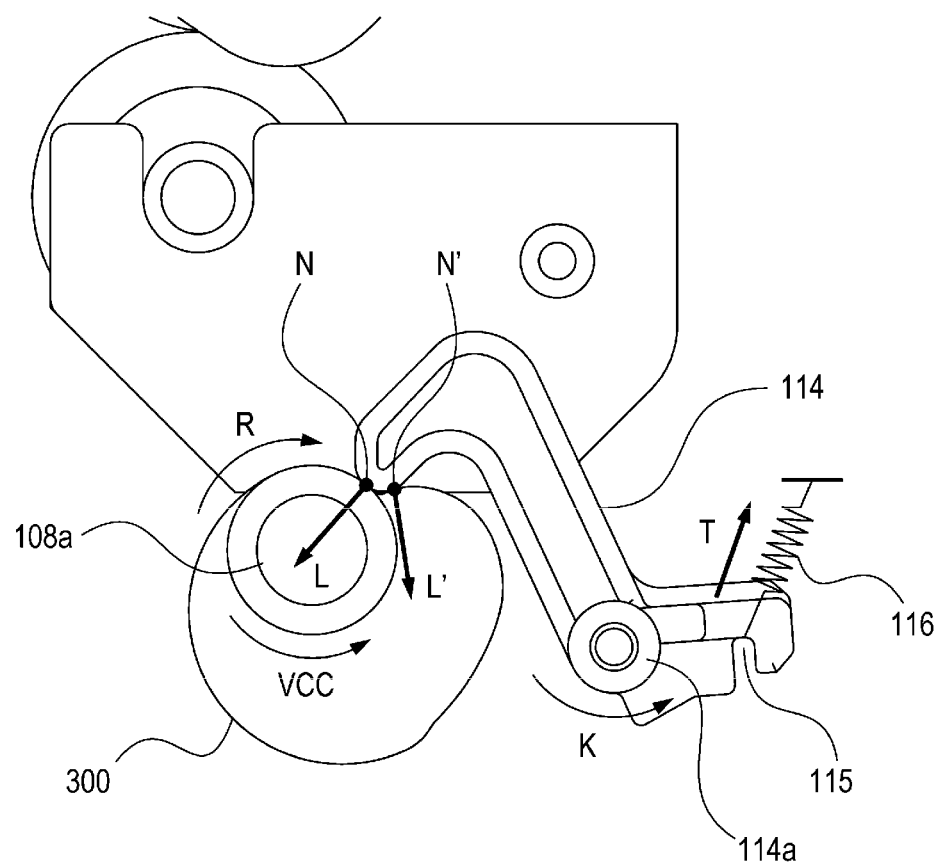
FIG. 8 is a diagram for describing an operation of the second cam of the tray feeding portion according to the first embodiment.

First, as illustrated in FIG. 8, when the driving force of the motor M is transferred to rotate the multicam shaft 108*a* in the VCC direction of arrow, the second cam 300 rotating in synchronization with the multicam shaft 108*a* rotates in the VCC direction of arrow. According to the rotation of the second cam 300, an abutting point between the second cam 300 and the brake lever 114 gradually moves from an abutting point N to an abutting point N'. Accordingly, the direction of the brake lever 114 pressing the second cam 300 is changed from the direction L of arrow (the axial direction of the second cam 300) to a direction L' of arrow.

In this way, when the brake lever 114 presses the second cam 300 in the direction L' of arrow, a rotational torque TMR around the multicam shaft 108*a* is generated in a direction R of arrow. The rotational torque TMR is a rotational torque in a direction opposed to the rotational torque TVCC generated by the release link 109 pressing the first cam 200. Therefore, the rotational torque TVCC is attenuated by generating the rotational torque TMR as described above. Accordingly, the rotation speed of the first cam 200 is reduced so as to reduce the deceleration rate of the lifting and lowering plate 106, so that it is possible to suppress the collision noise from being generated when the pickup roller 101 and the tray or the sheet S come into conflict.

Further, when the pickup roller 101 moves from the feed position to the separation position, the brake lever 114 does not necessarily always press the second cam 300 in the direction L' of arrow, so that the above-described effect can be achieved only by temporal pressing. In other words, the brake lever 114 may apply a force to suppress the rotation of the multicam 108 through the second cam 300 at least a partial period when the pickup roller 101 moves from the feed position to the separation position. In addition, the second cam 300 can be formed such that a timing when the brake lever 114 presses the second cam 300 in the direction L' of arrow is set after a timing of applying the rotational torque TVCC when the first cam 200 presses the release link 109.

In addition, the rotational torque TVCC can be reduced such that the rotation speed of the first cam 200 does not become faster than that based on the driving force of the motor M when the brake lever 114 presses the second cam 300 in the direction L' of arrow.

Next, an operation after the pickup roller 101 and the sheet S on the tray 100 abut on each other will be described. Even after the pickup roller 101 and the sheet S on the tray 100 abut on each other, the motor M is driven until a multiposition sensor (not illustrated) detects that the multicam 108 reaches a predetermined position. Therefore, the multicam 108 rotates in the VCC direction of arrow until the multicam 108 reaches the predetermined position.

Figure 9:
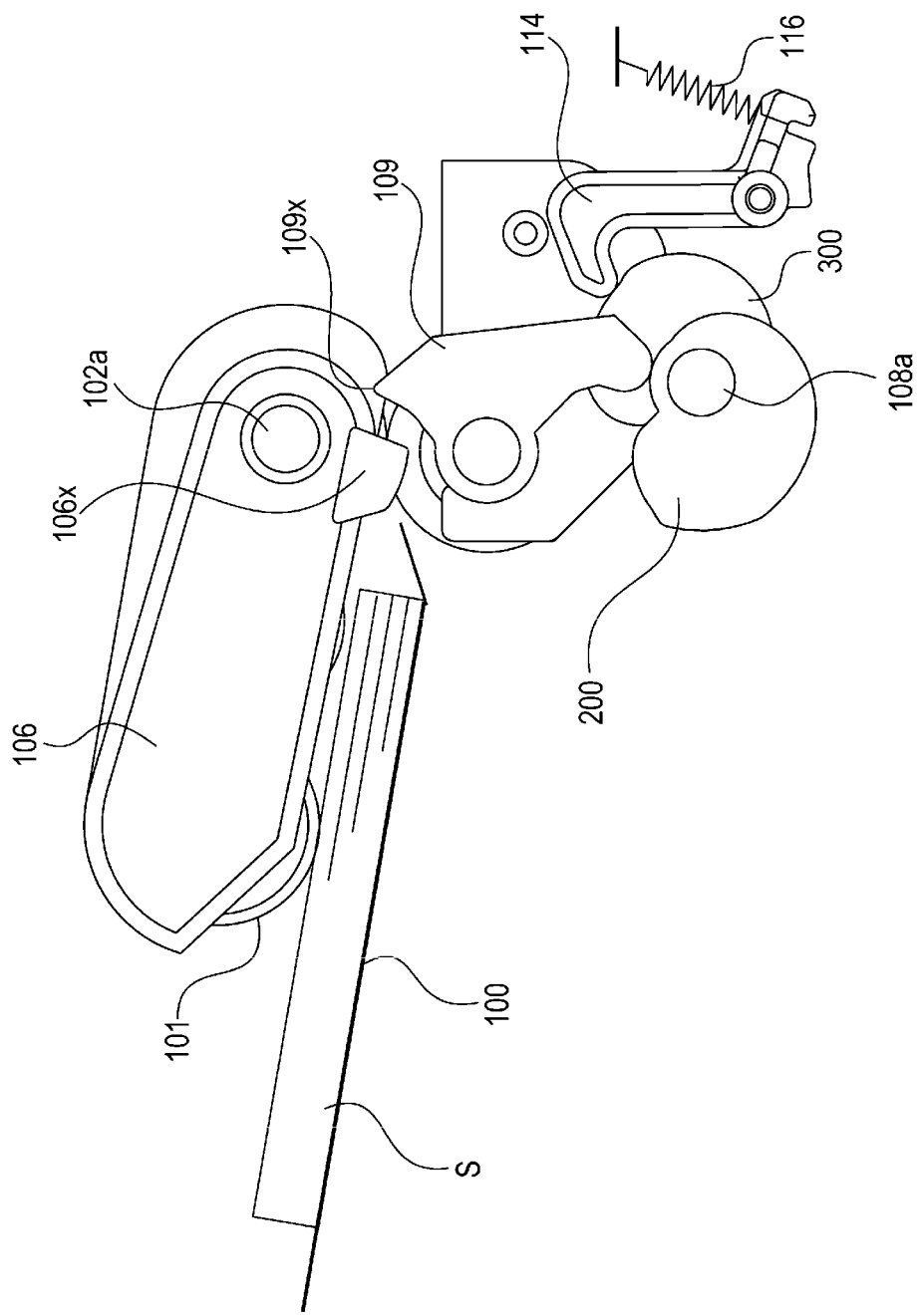
FIG. 9 is a diagram for describing an operation of the tray feeding portion according to the first embodiment.

Herein, when the first cam 200 further rotates in the VCC direction according to the rotation of the multicam 108, the plate abutting portion 109x further moves in a direction separated from the convex portion 106x. On the other hand, since the pickup roller 101 abuts on the sheet S, the lifting and lowering plate 106 does not rotate, and the convex portion 106x does not move in a direction to the plate abutting portion 109x. Therefore, as illustrated in FIG. 9, the convex portion 106x and the plate abutting portion 109x are completely separated from each other.

Figure 10:
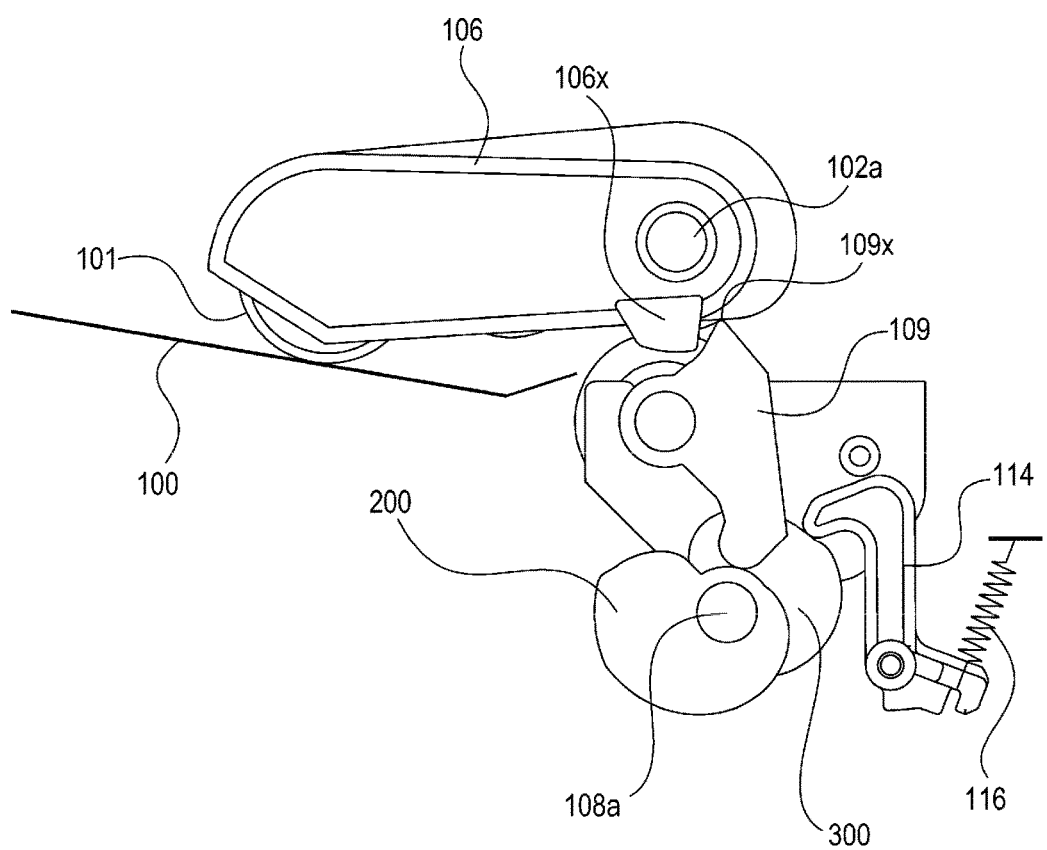
FIG. 10 is a diagram for describing an operation of the tray feeding portion according to the first embodiment.

Further, as illustrated in FIG. 10, even in a case where the sheet S is not stacked at the sheet stacking portion, since the pickup roller 101 abuts on the tray 100, the lifting and lowering plate 106 does not rotate and the convex portion 106x is not possible to move in the plate abutting portion 109x. Therefore, the convex portion 106x and the plate abutting portion 109x are completely separated from each other at a predetermined timing.

In this way, when the convex portion 106x and the plate abutting portion 109x are completely separated from, the pressing force FJ of the release link 109 pressing the first cam 200 becomes a force caused by a moment based on the weight of the release link 109. Then, when the multiposition sensor detects that the multicam 108 reaches the predetermined position and the pickup roller 101 is at the feed position the pressing force FJ is applied toward the axial direction of the first cam 200. Therefore, when the pickup roller 101 is at the feed position, a moment causing the rotation of the first cam 200 is not generated.

Figure 11:
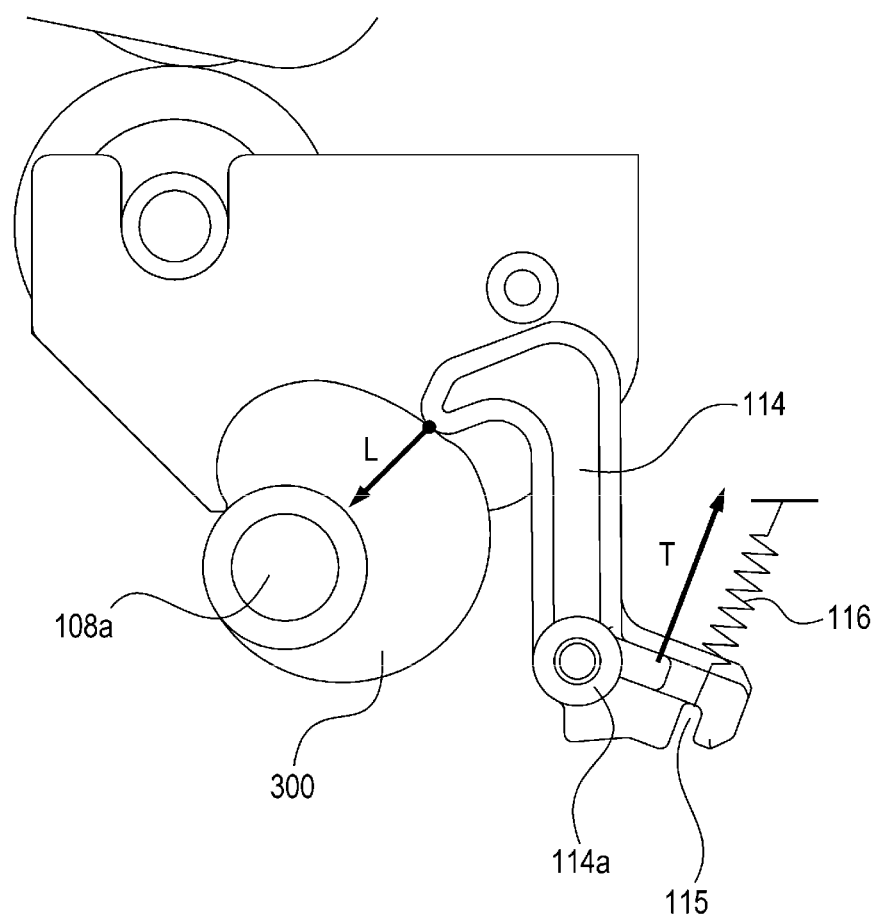
FIG. 11 is a diagram for describing an operation of the second cam of the tray feeding portion according to the first embodiment.

On the other hand, in the case of the brake lever 114, when the second cam 300 further rotates in the VCC direction according to the rotation of the multicam 108, the brake lever 114 is pressed upward due to the rotation. Therefore, the direction of the pressing force FL of the brake lever 114 pressing the second cam 300 is gradually changed. Then, when the multiposition sensor detects that the multicam 108 reaches the predetermined position and the pickup roller 101 is at the feed position, as illustrated in FIG. 11, the pressing force FL is applied toward the axial direction. Therefore, when the pickup roller 101 is at the feed position, there is no moment causing the rotation of the second cam 300 due to the force of the brake lever 114 pressing the second cam 300.

When the multiposition sensor (not illustrated) detects that the multicam 108 reaches the predetermined position and the pickup roller 101 is at the feed position, the driving of the motor M is stopped. Therefore, the rotation of the multicam shaft 108a in the VCC direction is also stopped.

<Feeding Operation>

Next, a feeding operation of the sheet S performed by the tray feeding portion 1 will be described.

Figure 12:
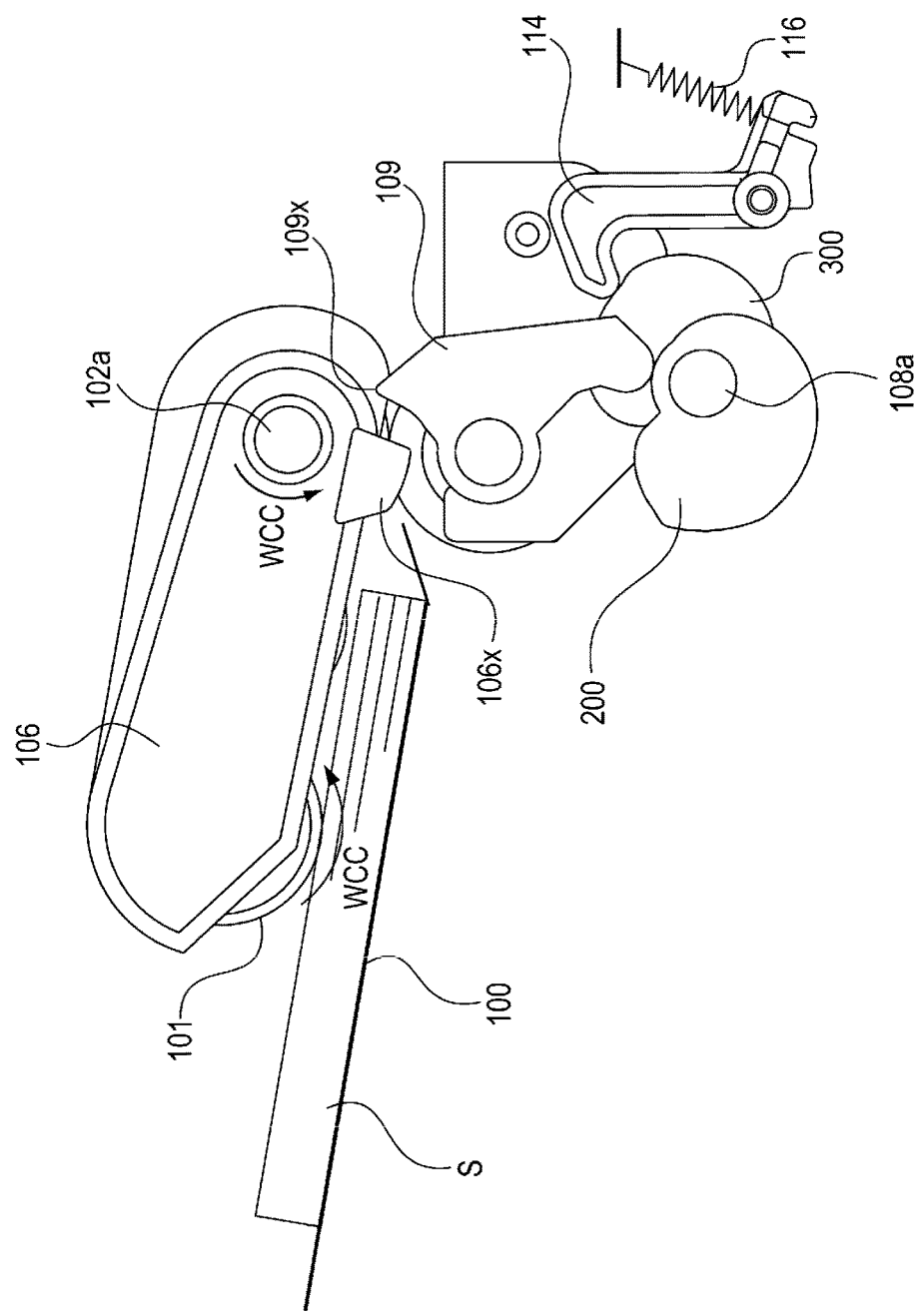
FIG. 12 is a diagram for describing a feeding operation of the tray feeding portion according to the first embodiment at the time of feeding a sheet.

First, when the multiposition sensor detects that the multicam 108 reaches the predetermined position and the pickup roller 101 reaches the feed position, the motor M is temporally stopped and then starts to be driven reversely to the previous direction. Therefore, the driving force in the WCC direction of arrow illustrated in FIG. 12 is transferred to the feeding roller shaft 102a through the feed gear 111, and the feeding roller shaft 102a starts to rotate in the WCC direction. In addition, the rotation driving force of the feeding roller shaft 102a is transferred to the pickup roller 101 through the drive train 117 and the pickup roller shaft 101a, and the pickup roller 101 rotates in the WCC direction of arrow. Therefore, the sheet S in the uppermost portion of the tray 100 is picked up by the pickup roller 101, and fed in the sheet conveying path through the feeding roller 102.

Further, when the feed gear 111 rotates in the WCC direction of arrow, the cam gear 110 rotates in a reverse direction, that is, the VC direction. As described above, when the cam gear 110 rotates in the VC direction, a driving force is not transferred to the multicam shaft 108a due to the operation of the one-way clutch. Therefore, the multicam 108 does not rotate during the feeding operation, and the lifting and lowering plate 106 is not lifted nor lowered.

Further, during the feeding operation, a biasing force caused by the roller pressuring spring 113 in the direction P of arrow is operated as a force of pressing the sheet S.

<Movement from Feed Position to Separation Position>

Next, an operation of the pickup roller 101 moving from the feed position to the separation position will be described. When the feeding operation is ended, the motor M first starts to be driven in a direction opposed to that during the feeding operation, and transfers a rotation force in the WC direction of arrow illustrated in FIG. 3 with respect to the feed gear 111. Therefore, as described above, the driving force is transferred to the multicam shaft 108a through the cam gear 110, and the multicam shaft 108a rotates in the VCC direction illustrated in FIG. 3. On the other hand, as described above, since the feed gear 111 runs idle, the driving force of the motor M is not transferred to the feeding roller shaft 102a.

Figure 13:
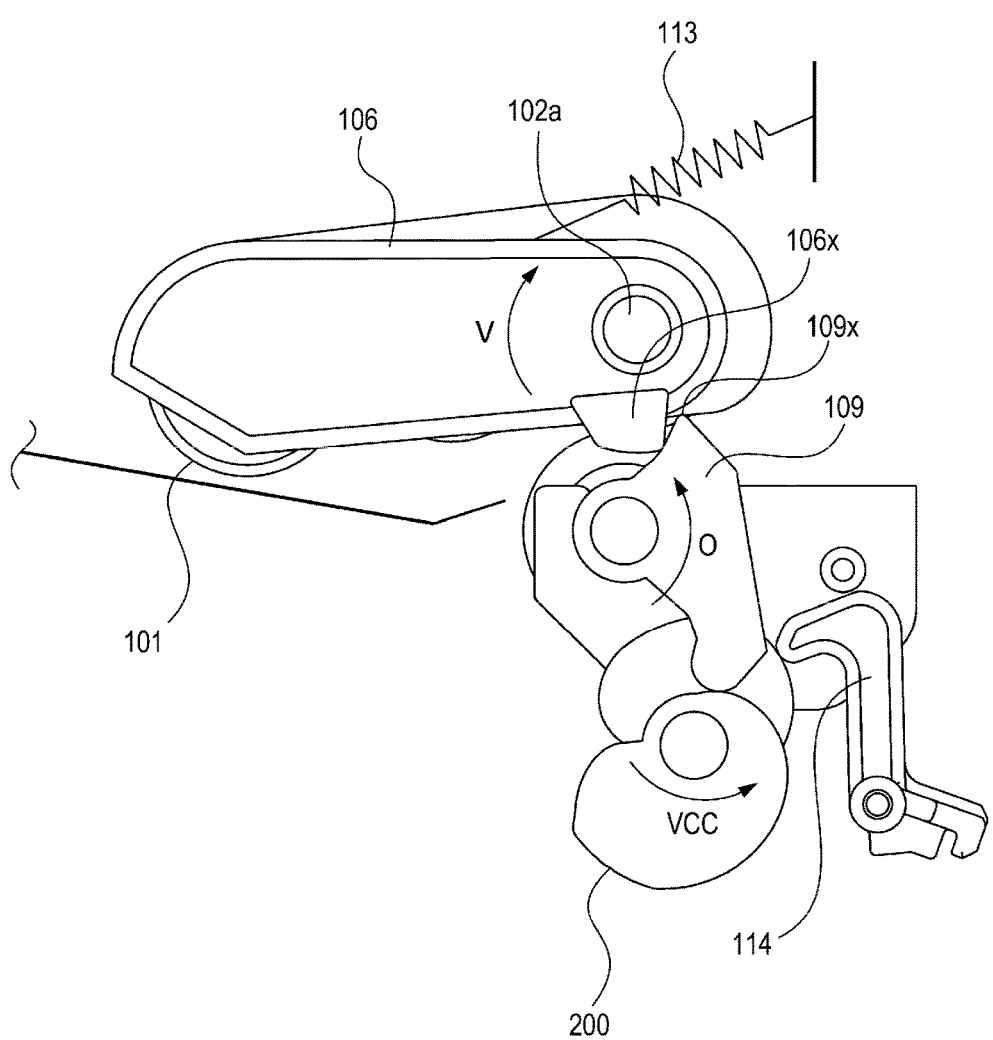
FIG. 13 is a diagram for describing an operation of the tray feeding portion according to the first embodiment at the time of moving to a separation position.

Next, when the multicam shaft 108a rotates in the VCC direction, the first cam 200 rotates in the VCC direction in synchronization with the rotation. When the first cam 200 rotates in the VCC direction, the release link 109 starts to rotate in a direction O of arrow while being pushed up as illustrated in FIG. 13. Therefore, the plate abutting portion 109x and the convex portion 106x separated from each other during the feeding operation gradually go near and abut on each other again.

When the first cam 200 further rotates, the plate abutting portion 109x presses the convex portion 106x to make the lifting and lowering plate 106 rotate in a direction V of arrow illustrated in FIG. 13. Therefore, the lifting and lowering plate 106 goes up and the pickup roller 101 moves in the separation position.

Figure 14:
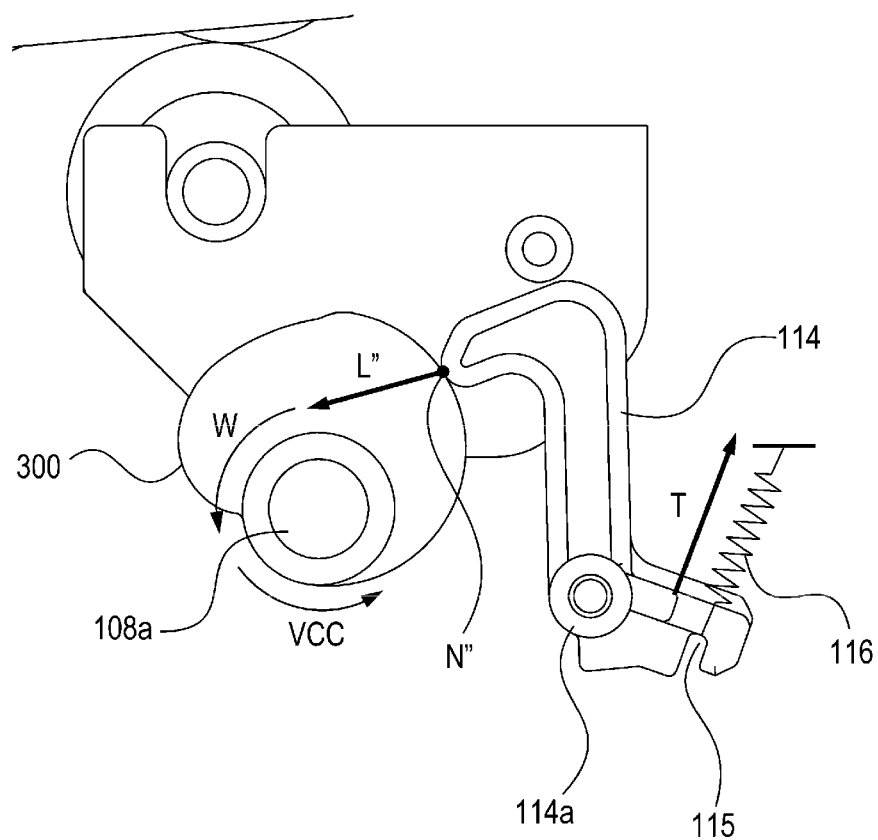
FIG. 14 is a diagram for describing an operation of the second cam of the tray feeding portion according to the first embodiment.

On the other hand, in the case of the second cam 300, when the multicam shaft 108a rotates in the VCC direction of arrow, the second cam 300 rotates in the VCC direction of arrow in synchronization with the rotation. When the second cam 300 rotates in the VCC direction of arrow, the abutting point between the second cam 300 and the brake lever 114 is changed based on the shape of the cam as illustrated in FIG. 14. Accordingly, the brake lever 114 pressing the second cam 300 in the axial direction starts to press the second cam 300 in a direction L" of arrow.

In this way, when the brake lever 114 presses the second cam 300 in the direction L" of arrow, a rotational torque TW in a direction W of arrow is applied to the second cam 300. The rotational torque TW is a torque in the same direction as the VCC direction in which the multicam 108 receives the driving force transferred from the motor M and rotates. Therefore, the driving force required for making the pickup roller 101 return from the feed position to the separation position is assisted, and it is possible to lower the driving force from the motor M required for making the lifting and lowering plate 106 go up.

Further, when the pickup roller 101 move to the feed position, the brake lever 114 is pressed by the second cam 300 as described above. Therefore, the tension force FT of the tension spring 116 becomes large when the pickup roller 101 is at the feed position compared to the separation position. Therefore, a force of the brake lever 114 pressing the second cam 300 in the direction L" of arrow also becomes large, and the rotational torque TW becomes large. Accordingly, the effect of lowering the driving force from the motor M required for making the lifting and lowering plate 106 go up is improved.

In addition, when the pickup roller 101 moves from the separation position to the feed position, the brake lever 114 is not necessary for always pressing the second cam 300 in the direction L" of arrow, but the above-described effect can be achieved only by temporal pressing. In addition, a timing when the brake lever 114 starts to press the second cam 300 in the direction L" of arrow can be set after a timing when the lifting and lowering plate 106 starts to rotate. Therefore, it is possible to prevent a severe collision between the convex portion 106x and the plate abutting portion 109x when the brake lever 114 presses the second cam 300, and noises can be suppressed.

Figure 15:
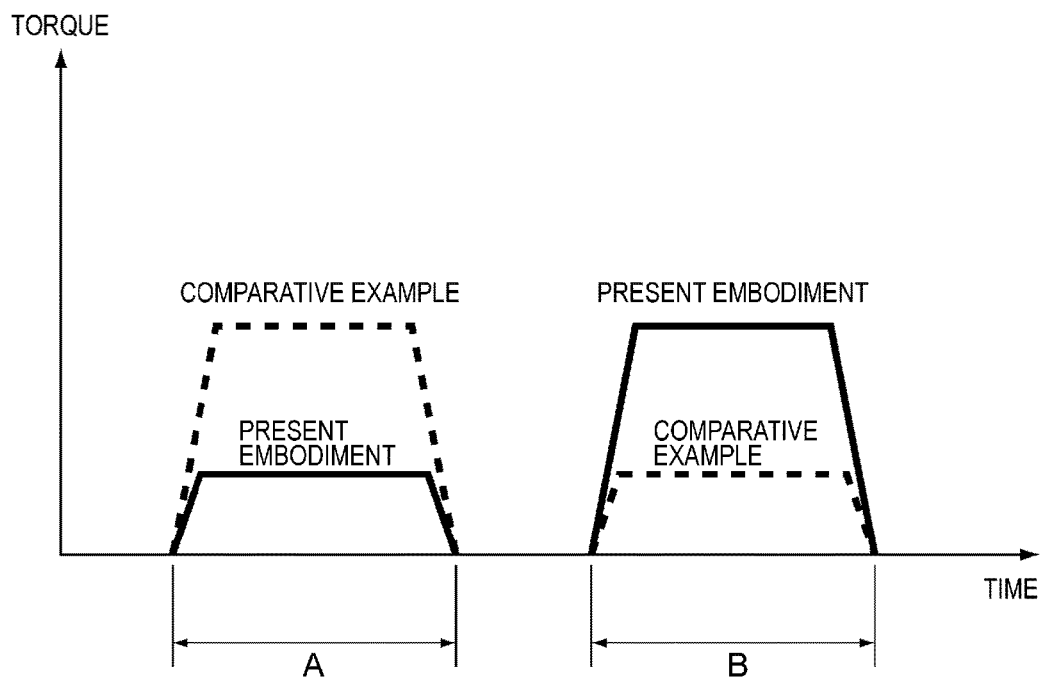
FIG. 15 is a graph showing a transition of torque operated on a multicam of the tray feeding portion according to the first embodiment.

FIG. 15 is a graph illustrating a transition of torque operated on the multicam 108 in the VCC direction of arrow (see FIG. 7) when the pickup roller 101 moves between the feed position and the separation position. In this graph, the horizontal axis represents time, and the vertical axis represents a torque amount. In addition, the solid line in the graph shows a transition of the torque of the image forming apparatus A according to this embodiment in which the brake lever 114 is provided, and the broken line shows a transition of the torque of the image forming apparatus according to a comparative example in which the brake lever 114 is not provided.

First, a time period A of the graph shows a transition of the torque when the pickup roller 101 moves from the separation position to the feed position. At this time, in the image forming apparatus A according to this embodiment, the rotational torque TVCC generated when the release link 109 presses the first cam 200 is lowered by the operation of a moment MR generated when the brake lever 114 presses the second cam 300. Therefore, the torque operated on the multicam 108 is suppressed to a relatively low value even when the torque transferred from the motor M is added. On the other hand, since the image forming apparatus according to the comparative example does not include the brake lever 114, the rotational torque TVCC generated when the release link 109 presses the first cam 200 becomes a large value without being lowered.

Next, a time period B of the graph shows a transition of the torque when the pickup roller 101 moves from the feed position to the separation position. At this time, since the image forming apparatus A according to this embodiment includes the brake lever 114, the rotational torque TW is added in the same direction as the rotation direction VCC based on the driving force transferred from the motor M. Therefore, the torque operated on the multicam 108 becomes large. On the other hand, since the image forming apparatus according to the comparative example does not include the brake lever 114, the torque is not added in the same direction as the rotation direction VCC based on the driving force transferred from the motor M. Therefore, the torque operated on the multicam 108 becomes small.

As can be seen from the above-described transition of the torque, the image forming apparatus A according to this embodiment achieves an effect that the rotation of the lifting and lowering plate 106 is decelerated when the pickup roller 101 moves from the separation position to the feed position, and the collision noise between the pickup roller 101 and the sheet S is suppressed. In addition, it can be seen that the driving force required when the pickup roller 101 moves from the feed position to the separation position, that is, the driving force transferred from the motor M can be reduced.

<Modification>

Figure 16:
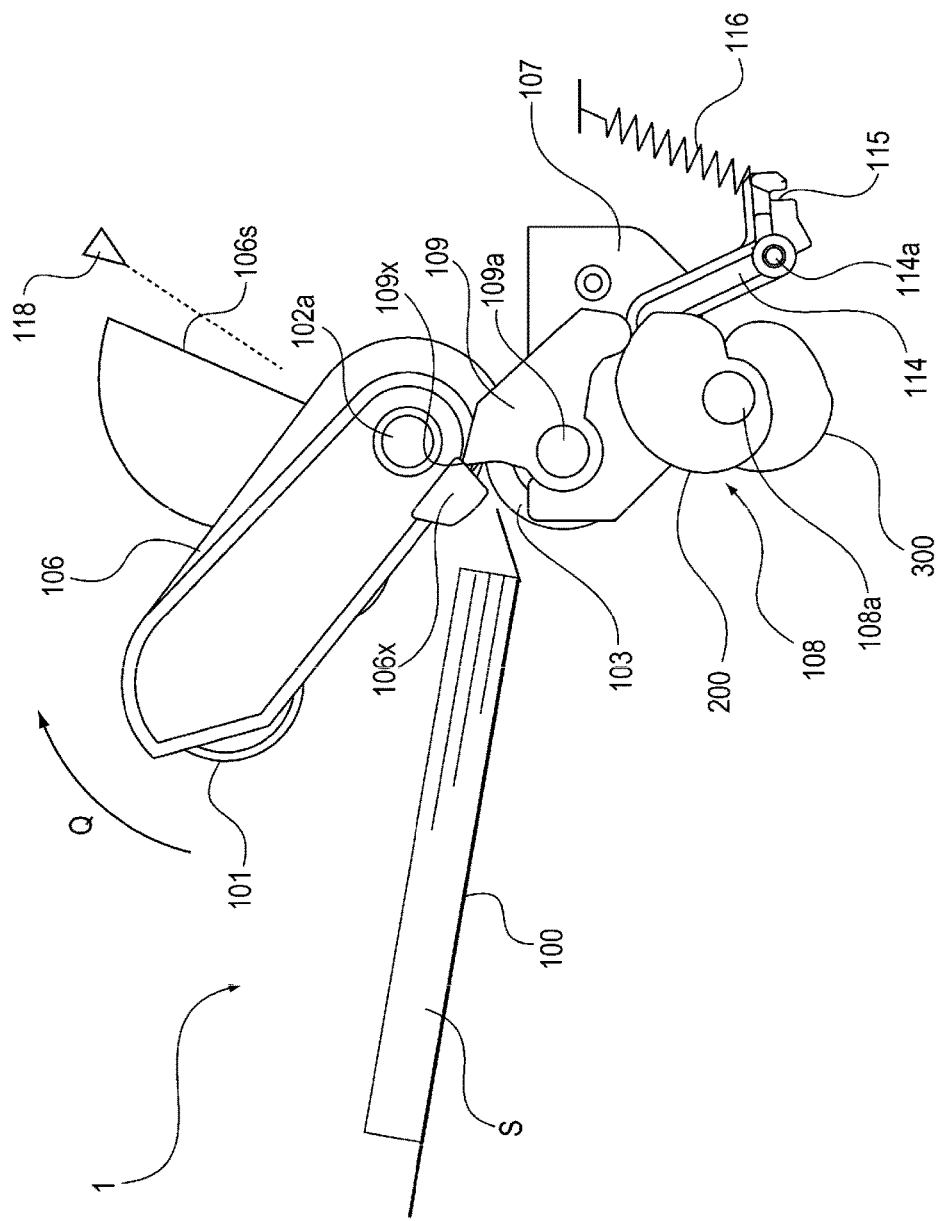
FIG. 16 is a diagram schematically illustrating a tray feeding portion according to a modification.

Next, a configuration of the tray feeding portion 1 according to a modification of the first embodiment will be described. The tray feeding portion 1 according to the modification is configured to include a detection portion 106s provided in a lifting and lowering plate 106 and a lifting and lowering plate sensor 118 as a position detection portion configured to detect the detection portion 106s in a frame (not illustrated) as illustrated in FIG. 16 in addition to the configuration of the first embodiment.

The detection portion 106s is detected by the lifting and lowering plate sensor 118 in a case where the lifting and lowering plate 106 is at a specific position in a rotatable region. The position of the lifting and lowering plate 106 detected by the lifting and lowering plate sensor 118 can be arbitrarily determined depending on the shape of the detection portion 106s. In the case of the configuration according to this modification, the lifting and lowering plate 106 is desirably configured to be detected in a region (hereinafter, this region is referred to as a lifting and lowering plate detection region) in which the lifting and lowering plate 106 rotates in a direction Q of arrow illustrated in FIG. 16 up to a position until the convex portion 106x of the lifting and lowering plate 106 and the plate abutting portion 109x of the release link 109 do not abut.

When a lifting and lowering command is issued from the controller C (see FIG. 1), a detection signal of the lifting and lowering plate sensor 118 is confirmed as a signal before the lifting and lowering operation of the lifting and lowering plate 106 is performed. Then, the lifting and lowering operation does not performed in a case where the detection portion 106s detects that the lifting and lowering plate 106 is positioned in the lifting and lowering plate detection region, but the lifting and lowering operation is performed in a case where the lifting and lowering plate 106 is positioned outside the lifting and lowering plate detection region.

In this way, the lifting and lowering operation of the lifting and lowering plate 106 can be performed only in a case where the lifting and lowering plate 106 is at an appropriate position by restricting the rotation of the lifting and lowering plate 106 according to the detection signal of the lifting and lowering plate sensor 118. Specifically, for example, in a case where the tray 100 is closed and the tray feeding portion 1 is stored inside the apparatus, the lifting and lowering operation is not performed because the detection portion 106s of the lifting and lowering plate 106 falls within the lifting and lowering plate detection region.

In addition, for example, in a case where paper jamming occurs during the lifting and lowering operation, or in a case where the power of the apparatus is switched, the tray 100 is swung, thereby causing the convex portion 106x of the lifting and lowering plate 106 to be displaced and not to abut on the plate abutting portion 109x of the release link 109 after the lifting and lowering operation starts. At this time, when the lifting and lowering plate 106 restarts the movement from the feed position to the separation position without the lifting and lowering plate sensor 118, the release link 109 rotates without a load to cause the movement of the convex portion 106x. In this case, in the configuration using the one-way clutch, the multicam 108 may rotate in excess of the control of the motor M due to the rotational torque TW (assist torque) in the direction W of arrow illustrated in FIG. 14 generated by the brake lever 114. However, as described above, by restricting the rotation of the lifting and lowering plate 106 according to the detection signal of the lifting and lowering plate sensor 118, it is possible to prevent that the multicam 108 rotates in excess of a required level by the rotational torque TW.

Further, the description in this embodiment has been made about the manual tray as the sheet feeding apparatus, but the invention is not limited thereto. In other words, the effect of the invention can be achieved by applying the configuration of the invention to the sheet storage portion 2 provided in the image forming apparatus A.

In addition, the description in this embodiment has been made about the color image forming apparatus of an intermediate transfer system, but the invention is not limited thereto. In other words, the effect of the invention can be achieved even by employing a monochromatic image forming apparatus which directly transfers a toner image formed in the photosensitive drum onto the sheet instead of the intermediate transfer system.

In addition, the effect of the invention can be achieved even by an image reading apparatus which includes an image reading portion to read image information of the fed sheet as an electric signal and is provided with the sheet feeding apparatus according to the invention instead of the image forming apparatus A.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2015-109279, filed May 29, 2015, No. 2015-135128 filed Jul. 6, 2015, which are hereby incorporated by reference herein in their entirety.

What is claimed is:

1. A sheet feeding apparatus configured to feed a sheet, the sheet feeding apparatus comprising:
a feeding rotating member configured to abut a stacked sheet and feed the sheet;
a supporting member configured to rotatably support the feeding rotating member, the supporting member being movable;
a biasing member configured to apply a biasing force to the supporting member so as to move the feeding rotating member toward the stacked sheet;
a first cam member configured to move the supporting member against the biasing force of the biasing member when the first cam member rotates in a first direction so that the feeding rotating member moves from a feed position where the feeding rotating member abuts the stacked sheet to a separation position where the feeding rotating member is separated from the stacked sheet;
a rotary member configured to rotate in a predetermined direction and an opposite direction opposite to the predetermined direction by a driving force from a drive source;
a one-way clutch configured to transfer a rotation force of the rotary member to the first cam member so that the first cam member rotates in the first direction while the rotary member rotates in the predetermined direction and not to transfer a rotation force of the rotary member to the first cam member while the rotary member rotates in the opposite direction; and
a brake unit configured to reduce a rotational torque of the first cam member which is caused by the biasing member and which causes the first cam member to rotate in the first direction while the first cam member rotates in the first direction and the feeding rotating member moves from the separation position to the feed position.

2. The sheet feeding apparatus according to claim 1, wherein the brake unit reduces the rotational torque causing the first cam member to rotate in the first direction so that a rotation speed in the first direction of the first cam member does not become faster than that in the first direction of the first cam member based on a driving force transferred from the drive source through the rotary member.

3. The sheet feeding apparatus according to claim 1, wherein the brake unit includes a second cam member configured to rotate in conjunction with the first cam member and a pressing portion configured to press the second cam member, and
wherein the pressing portion presses the second cam member to apply a rotational torque in the second direction in a case where the feeding rotating member moves from the separation position to the feed position so that the rotational torque causing the first cam member rotating in conjunction with the second cam member to rotate in the first direction is reduced.

4. The sheet feeding apparatus according to claim 3, wherein the pressing portion presses the second cam member to add a rotational torque causing the second cam member to rotate in the first direction.

5. The sheet feeding apparatus according to claim 4, wherein the pressing portion presses the second cam member to add a rotational torque causing the second cam member to rotate in the first direction after a timing when the support member starts to rotate.

6. The sheet feeding apparatus according to claim 3, wherein the pressing portion presses the second cam member to give a rotational torque causing the second cam member to rotate in the second direction after a timing when the biasing force is applied to the first cam by the biasing member to give a rotational torque causing the first cam member to rotate in the first direction.

7. The sheet feeding apparatus according to claim 3, wherein the pressing portion is configured to press the second cam member by a tension force of a spring, and the tension force of the spring becomes large when the feeding rotating member is at the feed position compared to the separation position.

8. The sheet feeding apparatus according to claim 3, wherein the first cam member and the second cam member are integrally formed.

9. The sheet feeding apparatus according to claim 1, wherein the brake unit includes a second cam member configured to rotate in conjunction with the first cam member and a pressing portion configured to press the second cam member.

10. The sheet feeding apparatus according to claim 1, further comprising a first gear configured to transfer a driving force from the drive source to a first shaft which is a rotation shaft of the support member, wherein the rotary member is a second gear configured to transfer a driving force to a second shaft which is a rotation shaft of the first cam member through the first gear, wherein the apparatus further comprises another one-way clutch configured to be provided in the first gear, transfer a driving force causing the first shaft to rotate in the first direction, and not transfer a driving force causing the first shaft to rotate in the second direction opposite to the first direction, wherein the one-way clutch is configured to be provided in the second gear, transfer a driving force causing the second shaft to rotate in the first direction, and not transfer a driving force causing the second shaft to rotate in the second direction opposite to the first direction, wherein when the first gear rotates in the first direction, the feeding rotating member rotating in synchronization with the rotation of the first shaft rotates in the first direction which is a direction of conveying the sheet, and the second gear rotates in the second direction not to transfer the driving force to the second shaft, and wherein when the first gear rotates in the second direction, the driving force is not transferred to the first shaft, the second gear rotates in the first direction, and the first cam member rotating in synchronization with the second shaft rotates in the first direction.

11. The sheet feeding apparatus according to claim 1, further comprising:
   a position detection portion configured to detect a position of the support member; and
   a controller configured to restrict the rotation of the support member based on a detection signal from the position detection portion.

12. A sheet feeding apparatus according to claim 1, further comprising a link member configured to rotate the supporting member according to a rotation of the first cam member.

13. An image reading apparatus configured to read image information of a sheet, the image reading apparatus comprising:
   (1) a sheet feeding apparatus configured to feed a sheet, wherein the sheet feeding apparatus includes:
      a feeding rotating member configured to abut a stacked sheet and feed the sheet;
      a supporting member configured to rotatably support the feeding rotating member, the supporting member being movable;
      a biasing member configured to apply a biasing force to the supporting member so as to move the feeding rotating member toward the stacked sheet;
      a first cam member configured to move the supporting member against the biasing force of the biasing member when the first cam member rotates in a first direction so that the feeding rotating member moves from a feed position where the feeding rotating member abuts the stacked sheet to a separation position where being separated from the sheet;
      a rotary member configured to rotate in a predetermined direction and an opposite direction opposite to the predetermined direction by a driving force from a drive source;
      a one-way clutch configured to transfer a rotation force of the rotary member to the first cam member so that the first cam member rotates in the first direction while the rotary member rotates in the predetermined direction and not to transfer a rotation force of the rotary member to the first cam member while the rotary member rotates in the opposite direction; and
      a brake unit configured to reduce a rotational torque of the first cam member which is caused by the biasing member and which causes the first cam member to rotate in the first direction while the first cam member rotates in the first direction and the feeding rotating member moves from the separation position to the feed position; and
   (2) an image reading portion configured to read the image information of the sheet fed by the sheet feeding apparatus as an electric signal.

14. An image forming apparatus configured to form an image in a sheet, the image forming apparatus comprising:
   (1) a sheet feeding apparatus configured to feed a sheet, wherein the sheet feeding apparatus includes:
      a feeding rotating member configured to abut a stacked sheet and feed the sheet;
      a supporting member configured to rotatably support the feeding rotating member, the supporting member being movable;
      a biasing member configured to apply a biasing force to the supporting member so as to move the feeding rotating member toward the stacked sheet;
      a first cam member configured to move the supporting member against the biasing force of the biasing member when the first cam member rotates in a first direction so that the feeding rotating member moves from a feed position where the feeding rotating member abuts the stacked sheet to a separation position where being separated from the sheet;
      a rotary member configured to rotate in a predetermined direction and an opposite direction opposite to the predetermined direction by a driving force from a drive source;
      a one-way clutch configured to transfer a rotation force of the rotary member to the first cam member so that the first cam member rotates in the first direction while the rotary member rotates in the predetermined direction and not to transfer a rotation force of the rotary member to the first cam member while the rotary member rotates in the opposite direction; and
      a brake unit configured to reduce a rotational torque of the first cam member which is caused by the biasing member and which causes the first cam member to rotate in the first direction while the first cam member rotates in the first direction and the feeding rotating member moves from the separation position to the feed position; and
   (2) an image forming portion configured to transfer a toner image borne in an image bearing member to the sheet fed by the sheet feeding apparatus to form an image.

15. The image forming apparatus according to claim 14, wherein the sheet feeding apparatus is a manual tray which is provided outside the image forming apparatus at the time of forming the image.

16. A sheet feeding apparatus configured to feed a sheet, the sheet feeding apparatus comprising:
   a feeding rotating member configured to abut a stacked sheet and feed the sheet;
   a support member configured to be rotatably provided about a first shaft and support the feeding rotating member;
   a multicam configured to be rotatably provided about a second shaft and include a first cam member and a second cam member;

a first gear configured to transfer a driving force from a drive source to the first shaft;

a second gear configured to transfer the driving force from the drive source to the second shaft through the first gear;

a first one-way clutch configured to be provided in the first gear, transfer a driving force causing the first shaft to rotate in a first direction, and not transfer a driving force causing the first shaft to rotate in a second direction opposite to the first direction;

a second one-way clutch configured to be provided in the second gear, transfer a driving force causing the second shaft to rotate in the first direction, and not transfer a driving force causing the second shaft to rotate in the second direction opposite to the first direction; and a brake lever configured to abut the second cam member and be capable of suppressing the multicam from rotating in the first direction, wherein, in a case where the first gear rotates in the first direction, the feeding rotating member rotating in synchronization with the rotation of the first shaft rotates in a direction of conveying the sheet, and the second gear rotates in the second direction and does not transfer the driving force to the second shaft, wherein, in a case where the first gear rotates in the second direction, the driving force is not transferred to the first shaft, the second gear rotates in the first direction, and the first cam member rotates in the first direction, wherein the first cam member rotates in the first direction to cause the support member to move from a separation position where the feeding rotating member is separated from the sheet to a feed position where the feeding rotating member abuts on the stacked sheet and feeds the sheet, and wherein the brake lever suppresses the multicam from rotating in the first direction at least a partial period when the support member moves from the separation position to the feed position.

17. An image reading apparatus configured to read image information of a sheet, the image reading apparatus comprising:

(1) a sheet feeding apparatus configured to feed a sheet, wherein the sheet feeding apparatus includes:

a feeding rotating member configured to abut a stacked sheet and feed the sheet;

a support member configured to be rotatably provided about a first shaft and support the feeding rotating member;

a multicam configured to be rotatably provided about a second shaft and include a first cam member and a second cam member;

a first gear configured to transfer a driving force from a drive source to the first shaft;

a second gear configured to transfer the driving force from the drive source to the second shaft through the first gear;

a first one-way clutch configured to be provided in the first gear, transfer a driving force causing the first shaft to rotate in a first direction, and not transfer a driving force causing the first shaft to rotate in a second direction opposite to the first direction;

a second one-way clutch configured to be provided in the second gear, transfer a driving force causing the second shaft to rotate in the first direction, and not transfer a driving force causing the second shaft to rotate in the second direction opposite to the first direction;

a brake lever configured to abut the second cam member and be capable of suppressing the multicam from rotating in the first direction, wherein, in a case where the first gear rotates in the first direction, the feeding rotating member rotating in synchronization with the rotation of the first shaft rotates in a direction of conveying the sheet, and the second gear rotates in the second direction and does not transfer the driving force to the second shaft, wherein, in a case where the first gear rotates in the second direction, the driving force is not transferred to the first shaft, the second gear rotates in the first direction, and the first cam member rotates in the first direction, wherein the first cam member rotates in the first direction to cause the support member to move from a separation position where the feeding rotating member is separated from the sheet to a feed position where the feeding rotating member abuts on the stacked sheet and feeds the sheet, wherein the brake lever suppresses the multicam from rotating in the first direction at least a partial period when the support member moves from the separation position to the feed position; and (2) an image reading portion configured to read the image information of the sheet fed by the sheet feeding apparatus as an electric signal.

18. An image forming apparatus configured to form an image in a sheet, the image forming apparatus comprising:

(1) a sheet feeding apparatus configured to feed a sheet, wherein the sheet feeding apparatus includes:

a feeding rotating member configured to abut a stacked sheet and feed the sheet;

a support member configured to be rotatably provided about a first shaft and support the feeding rotating member;

a multicam configured to be rotatably provided about a second shaft and include a first cam member and a second cam member;

a first gear configured to transfer a driving force from a drive source to the first shaft;

a second gear configured to transfer the driving force from the drive source to the second shaft through the first gear;

a first one-way clutch configured to be provided in the first gear, transfer a driving force causing the first shaft to rotate in a first direction, and not transfer a driving force causing the first shaft to rotate in a second direction opposite to the first direction;

a second one-way clutch configured to be provided in the second gear, transfer a driving force causing the second shaft to rotate in the first direction, and not transfer a driving force causing the second shaft to rotate in the second direction opposite to the first direction;

a brake lever configured to abut the second cam member and be capable of suppressing the multicam from rotating in the first direction, wherein, in a case where the first gear rotates in the first direction, the feeding rotating member rotating in synchronization with the rotation of the first shaft rotates in a direction of conveying the sheet, and the second gear rotates in the second direction and does not transfer the driving force to the second shaft, wherein, in a case where the first gear rotates in the second direction, the driving force is not transferred to the first shaft, the second gear rotates in the first direction, and the first cam member rotates in the first direction, wherein the first cam member rotates in the first direction to cause the support member to move from a separation position where the feeding rotating member is separated from the sheet to a feed position where the feeding rotating member abuts on the stacked sheet and feeds the sheet, wherein the brake lever suppresses the multicam from rotating in the first direction at least a partial period when the support member moves from the separation position to the feed position; and (2) an image forming portion configured to transfer a toner image borne in an image bearing member to the sheet fed by the sheet feeding apparatus to form an image.

19. A sheet feeding apparatus configured to feed a sheet, the sheet feeding apparatus comprising:
a feeding rotating member configured to feed a sheet;
a supporting member configured to rotatably support the feeding rotating member and configured to be movable;
a biasing member configured to apply a biasing force to the supporting member so that the feeding rotating member moves toward the sheet;
a cam member configured to move the supporting member against the biasing force of the biasing member so that the feeding rotating member separates from the sheet by rotating in a first direction;
a rotary member configured to rotate in a predetermined direction and an opposite direction opposite to the predetermined direction by a driving force from a drive source;
a one-way clutch configured to transfer a rotation force of the rotary member to the cam member so that the cam member rotates in the first direction while the rotary member rotates in the predetermined direction and not to transfer a rotation force of the rotary member to the cam member while the rotary member rotates in the opposite direction; and
a brake unit configured to brake the supporting member to which the biasing force of the biasing member is applying while the cam member is rotating in the first direction and the supporting member is moving so that the feeding rotating member moves toward the sheet.

20. The sheet feeding apparatus according to claim 19, wherein the brake unit includes an elastic member configured to bear a force to restrict a rotation of the supporting member caused by the biasing force applied to the supporting member.

* * * * *